US012652345B2

(12) United States Patent
Liang et al.

(10) Patent No.: US 12,652,345 B2
(45) Date of Patent: Jun. 9, 2026

(54) SHOOTING DISPLAY METHOD AND DEVICE

(71) Applicant: HUAWEI TECHNOLOGIES CO., LTD., Shenzhen (CN)

(72) Inventors: Haowei Liang, Shanghai (CN); Huaqi Hao, Milan (IT)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 282 days.

(21) Appl. No.: 18/689,312

(22) PCT Filed: Aug. 11, 2022

(86) PCT No.: PCT/CN2022/111900
§ 371 (c)(1),
(2) Date: Mar. 5, 2024

(87) PCT Pub. No.: WO2023/035855
PCT Pub. Date: Mar. 16, 2023

(65) Prior Publication Data
US 2024/0372940 A1 Nov. 7, 2024

(30) Foreign Application Priority Data
Sep. 8, 2021 (CN) .......................... 202111052014.4

(51) Int. Cl.
*H04M 1/72454* (2021.01)
*H04N 23/611* (2023.01)

(52) U.S. Cl.
CPC ...... *H04M 1/72454* (2021.01); *H04N 23/611* (2023.01)

(58) Field of Classification Search
CPC ......... H04M 1/72454; H04M 1/72463; H04M 2250/16; H04M 2250/52; H04N 23/611; H04N 23/60; H04N 23/62; G06F 3/013
(Continued)

(56) References Cited

U.S. PATENT DOCUMENTS

2016/0092070 A1* 3/2016 Chen ...................... H04W 4/024
345/173
2017/0026510 A1* 1/2017 Wang .................... H04L 67/306
(Continued)

FOREIGN PATENT DOCUMENTS

| CN | 108108604 A | 6/2018 |
| CN | 109828732 A | 5/2019 |
| CN | 110049176 A | 7/2019 |

*Primary Examiner* — Don N Vo
(74) *Attorney, Agent, or Firm* — WOMBLE BOND DICKINSON (US) LLP

(57) ABSTRACT

Disclosed is a method of image capturing on a device that includes a first face and a second face with a second camera. A first screen and a first camera are disposed on the first face. The method includes: in response to a first operation, starting the second camera or opening an application using the second camera, and invoking the first camera to capture a first image set; and performing security processing on the first screen if: (1) the first target person does not exist in front of the first screen, or (2) the first target person exists in front of the first screen but (i) a first distance between the first target person and the first screen is less than a first threshold and the first target person does not look at the first screen, or (ii) the first distance is greater than or equal to the first threshold.

20 Claims, 9 Drawing Sheets

(58) Field of Classification Search
USPC .......................................................... 455/418
See application file for complete search history.

(56) References Cited

U.S. PATENT DOCUMENTS

2018/0227478  A1*   8/2018  Li  ........................... H04N 5/272
2021/0073421  A1     3/2021  Anderson et al.
2022/0277101  A1*   9/2022  Agarwal  .............. G06V 40/161

* cited by examiner

SHOOTING DISPLAY METHOD AND DEVICE

CROSS-REFERENCE TO RELATED APPLICATIONS

This application is a National Stage of International Application No. PCT/CN2022/111900 filed on Aug. 11, 2022, which claims priority to Chinese Patent Application No. 202111052014.4, filed on Sep. 8, 2021. Both of the aforementioned applications are hereby incorporated by reference in their entireties.

TECHNICAL FIELD

This application relates to the field of communication technologies, and in particular, to a shooting display method and a device.

BACKGROUND

With popularization of intelligent terminals, more and more users begin to pay attention to a privacy security problem in a process of using the intelligent terminals. Existing intelligent terminals are roughly classified into two types: a single-screen terminal and a multi-screen terminal. For the single-screen terminal, when a user takes a selfie in a "large wide-angle" mode or the like, the intelligent terminal invokes a rear-facing camera to perform shooting, and a home screen of the intelligent terminal normally displays an image. The user cannot see the home screen, and the image on the home screen is easily seen by another person, causing leakage of user privacy information. For the multi-screen intelligent terminal, for example, a dual-screen intelligent terminal, a front face of the intelligent terminal includes one screen (which may be referred to as an inner screen), and a rear face of the intelligent terminal includes the other screen (which may be referred to as an outer screen). An existing dual-screen terminal has a function of simultaneous display of an inner screen and an outer screen. When a user uses a rear-facing camera to take a selfie, the user observes movements of the user in real time by using the outer screen of the intelligent terminal, to adjust a posture and an angle of the user. In addition, the inner screen and the outer screen of the intelligent terminal display a same image, the inner screen faces away from the user, and user privacy information is easily leaked through the inner screen.

SUMMARY

Embodiments of this application disclose a shooting display method and a device, so that whether a screen is used can be determined when an electronic device performs shooting, and security processing is performed on an unused screen, to prevent user privacy information from being leaked through the screen.

A first aspect of this application discloses a shooting display method, applied to an electronic device. The electronic device includes a first face and a second face. A first screen and a first camera are disposed on the first face. A second camera is disposed on the second face. The method includes:

receiving a first operation input by a user, where the first operation is used to start the second camera or used to open an application using the second camera;

in response to the first operation, starting, by the electronic device, the second camera, and invoking the first camera to capture a first environmental image set;

determining, by the electronic device based on the first environmental image set, whether a first target person exists in front of the first screen; and if the first target person does not exist in front of the first screen, performing security processing on the first screen; or if the first target person exists in front of the first screen, obtaining a first distance between the first target person and the first screen; and if the first distance is less than a first threshold, and the first target person does not look at the first screen, or if the first distance is greater than or equal to the first threshold, performing security processing on the first screen.

The performing security processing on the first screen includes performing blur processing on content displayed on the first screen or controlling the first screen to turn off.

In a first embodiment of the first aspect, the method further includes:

if the first distance is less than the first threshold, and the first target person looks at (e.g., stares at, watches, or focuses on) the first screen, controlling the first screen to perform normal display.

In a first embodiment of the first aspect, if the first target person exists in front of the first screen, the method further includes:

determining whether the first target person looks at (e.g., stares at, watches, or focuses on) the first screen; and if the first target person does not look at the first screen, performing security processing on the first screen.

In a first embodiment of the first aspect, the first face and the second face are disposed back to back.

In a first embodiment of the first aspect, the electronic device further includes a second screen, the second screen is disposed on the second face, and the method further includes:

in response to the first operation, further determining, by the electronic device based on a second environmental image set captured by the second camera, whether a second target person exists in front of the second screen; and if the second target person does not exist in front of the second screen, performing security processing on the second screen.

The performing security processing on the second screen includes performing blur processing on content displayed on the second screen or controlling the second screen to turn off.

In a first embodiment of the first aspect, the method further includes:

if the second target person exists in front of the second screen, obtaining a second distance between the second target person and the second screen;

determining whether the second distance is less than a second threshold; and if the second distance is greater than or equal to the second threshold, performing security processing on the second screen.

In a first embodiment of the first aspect, the method further includes:

if the second distance is less than the second threshold, determining whether the second target person looks at (e.g., stares at, watches, or focuses on) the second screen; and if the second target person does not look at the second screen, performing security processing on the second screen.

In a first embodiment of the first aspect, the method further includes:

if the second target person exists in front of the second screen, determining whether the second target person looks at (e.g., stares at, watches, or focuses on) the second screen, and if the second target person does not look at the second screen, performing security processing on the second screen.

In a first embodiment of the first aspect, the method further includes:

if the second target person looks at (e.g., stares at, watches, or focuses on) the second screen, obtaining a second distance between the second target person and the second screen, and determining whether the second distance is less than a second threshold; and if the second distance is greater than or equal to the second threshold, performing security processing on the second screen.

In a first embodiment of the first aspect, the method further includes:

if the second distance is less than the second threshold, and the second target person looks at (e.g., stares at, watches, or focuses on) the second screen, controlling the second screen to perform normal display.

In a first embodiment of the first aspect, the electronic device stores a plurality of second thresholds, and the method further includes:

obtaining a usage scenario of the first operation;

obtaining a correspondence between the usage scenario and the plurality of second thresholds; and determining, based on the usage scenario and the correspondence, the second threshold corresponding to the usage scenario.

In a first embodiment of the first aspect, the first environmental image set includes an image captured by the first camera within a preset time, and the determining whether the first target person looks at (e.g., stares at, watches, or focuses on) the first screen includes:

determining an idle time based on the first environmental image, where the idle time is duration in which the first target person does not look at the first screen within the preset time;

determining whether the idle time is greater than a time threshold; and if the idle time is greater than the time threshold, determining that the first target person does not look at the first screen; or if the idle time is less than or equal to the time threshold, determining that the first target person looks at (e.g., stares at, watches, or focuses on) the first screen.

A second aspect of this application discloses a computer-readable storage medium, including computer instructions. When the computer instructions are run on an electronic device, the electronic device is enabled to perform the shooting display method according to the first aspect.

A third aspect of this application discloses an electronic device. The electronic device includes a processor and a memory: The memory is configured to store instructions, and the processor is configured to invoke the instructions in the memory, to enable the electronic device to perform the shooting display method according to the first aspect.

A fourth aspect of this application discloses a chip system. The chip system is used in an electronic device. The chip system includes an interface circuit and a processor. The interface circuit and the processor are interconnected by using a line. The interface circuit is configured to receive a signal from a memory of the electronic device, and send the signal to the processor. The signal includes computer instructions stored in the memory. When the processor executes the computer instructions, the chip system performs the shooting display method according to the first aspect.

A fifth aspect of this application discloses a computer program product. When the computer program product runs on a computer, the computer is enabled to perform the shooting display method according to the first aspect.

A sixth aspect of this application discloses an apparatus. The apparatus has a function of implementing behavior of the electronic device in the method provided in the first aspect. The function may be implemented by hardware, or may be implemented by hardware by executing corresponding software. The hardware or software includes one or more modules corresponding to the foregoing function.

It should be understood that the computer-readable storage medium according to the second aspect, the electronic device according to the third aspect, the chip system according to the fourth aspect, the computer program product according to the fifth aspect, and the apparatus according to the sixth aspect are all corresponding to the method according to the first aspect. Therefore, for beneficial effects that can be achieved by the computer-readable storage medium, the electronic device, the chip system, the computer program product, and the apparatus, refer to beneficial effects in the corresponding method provided above. Details are not described herein again.

DESCRIPTION OF EMBODIMENTS

For ease of understanding, descriptions of some concepts related to embodiments of this application are provided as examples for reference, as shown in the following:

It should be noted that, in this application, "at least one" means one or more, and "a plurality of" means two or more. "And/or" describes an association relationship between associated objects, and indicates that three relationships may exist. For example, A and/or B may indicate the following cases: Only A exists, both A and B exist, and only B exists, where A and B may be singular or plural. In the specification, claims, and accompanying drawings of this application, the terms "first", "second", "third", "fourth", and so on (if existent) are intended to distinguish between similar objects, but do not necessarily indicate a specific order or sequence.

To better understand the shooting display method and the related device disclosed in embodiments of this application, the following first describes an application scenario of the shooting display method in this application.

Figure 1A:
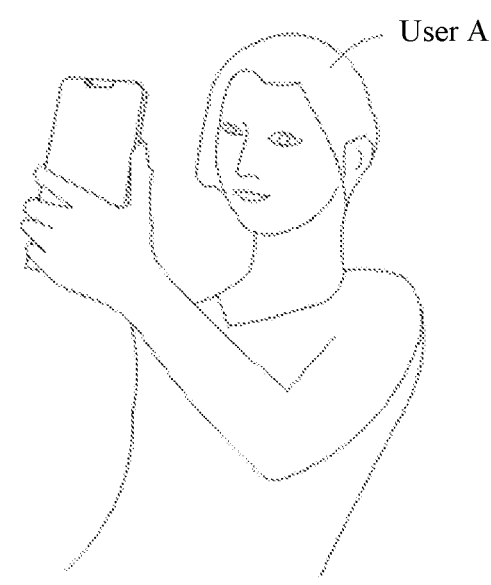
FIG. 1A is a schematic diagram of an application scenario of a shooting display method according to an embodiment of this application.
Figure 1B:
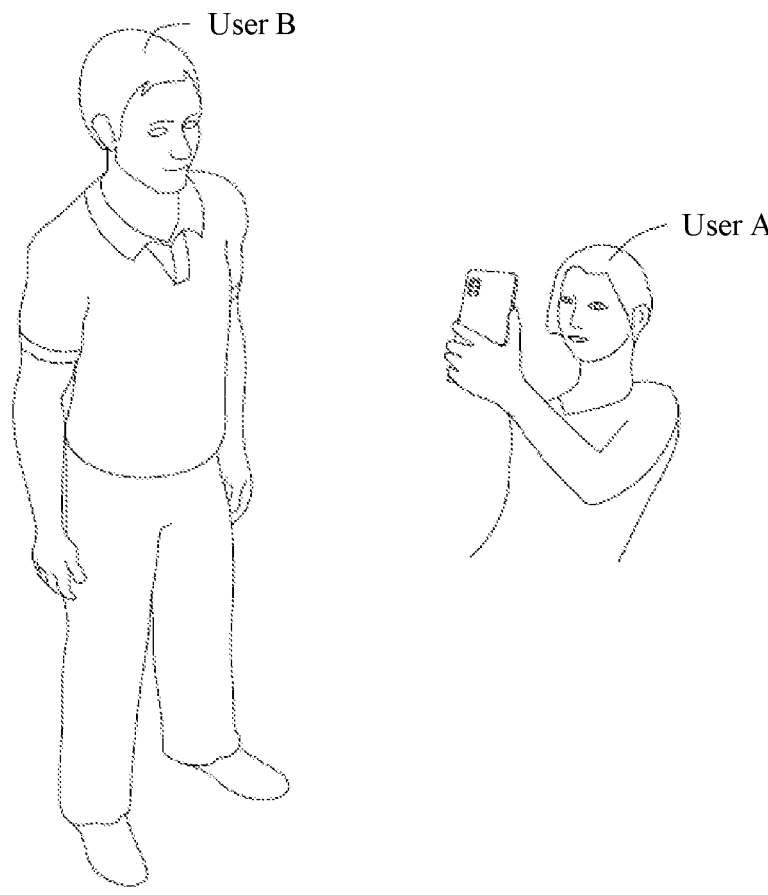
FIG. 1B is a schematic diagram of an application scenario of a shooting display method according to another embodiment of this application.

FIG. 1A and FIG. 1B are schematic diagrams of application scenarios of a shooting display method according to an embodiment of this application. FIG. 1A is a schematic diagram in which a user holds an electronic device to take a selfie, and FIG. 1B is a schematic diagram in which a user A holds an electronic device to photograph a user B. The electronic device in FIG. 1A and FIG. 1B is an intelligent terminal, and a user may shoot an image by using the intelligent terminal.

Currently, a shooting effect of a rear-facing camera of an electronic device is better than that of a front-facing camera of the electronic device, and some shooting functions, for example, "wide aperture" photographing, are only provided by the rear-facing camera. When the user uses the rear-facing camera to take a selfie shown in FIG. 1A, a screen of the electronic device faces away from the user, and the user cannot see the screen. However, another person on a side of the screen may see content displayed on the screen, for example, WeChat notification information. This easily causes leakage of user privacy information.

For example, some existing applications may perform skin detection for the user of the electronic device. For example, an Aijifu application invokes a camera of an intelligent terminal to perform high-definition imaging, and performs quantization detection on a skin status of the user based on a formed image. To ensure accuracy of skin detection, the Aijifu application recommends a user to use a rear-facing camera to perform detection. When the user uses the Aijifu to perform skin detection, the following two scenarios exist.

Scenario 1: As shown in FIG. 1B, the user A holds the intelligent terminal and invokes a rear-facing camera to perform skin detection for the user B. For example, if the user A exists in front of a screen of the intelligent terminal, and the user A is a user of the intelligent terminal, there is no risk of leakage of user privacy in the scenario 1.

Scenario 2: As shown in FIG. 1A, the user A holds the intelligent terminal and invokes a rear-facing camera to perform skin detection for the user A. There is no user in front of a screen of the intelligent terminal, and the screen faces away from the user A. The user A cannot see content displayed on the screen. However, if a passerby exists in front of the screen, the passerby may view the content displayed on the screen, causing user privacy leakage.

It can be learned that in a process in which the user uses the intelligent terminal to capture an image, there is a risk that user privacy is leaked through the screen.

Figure 1C:
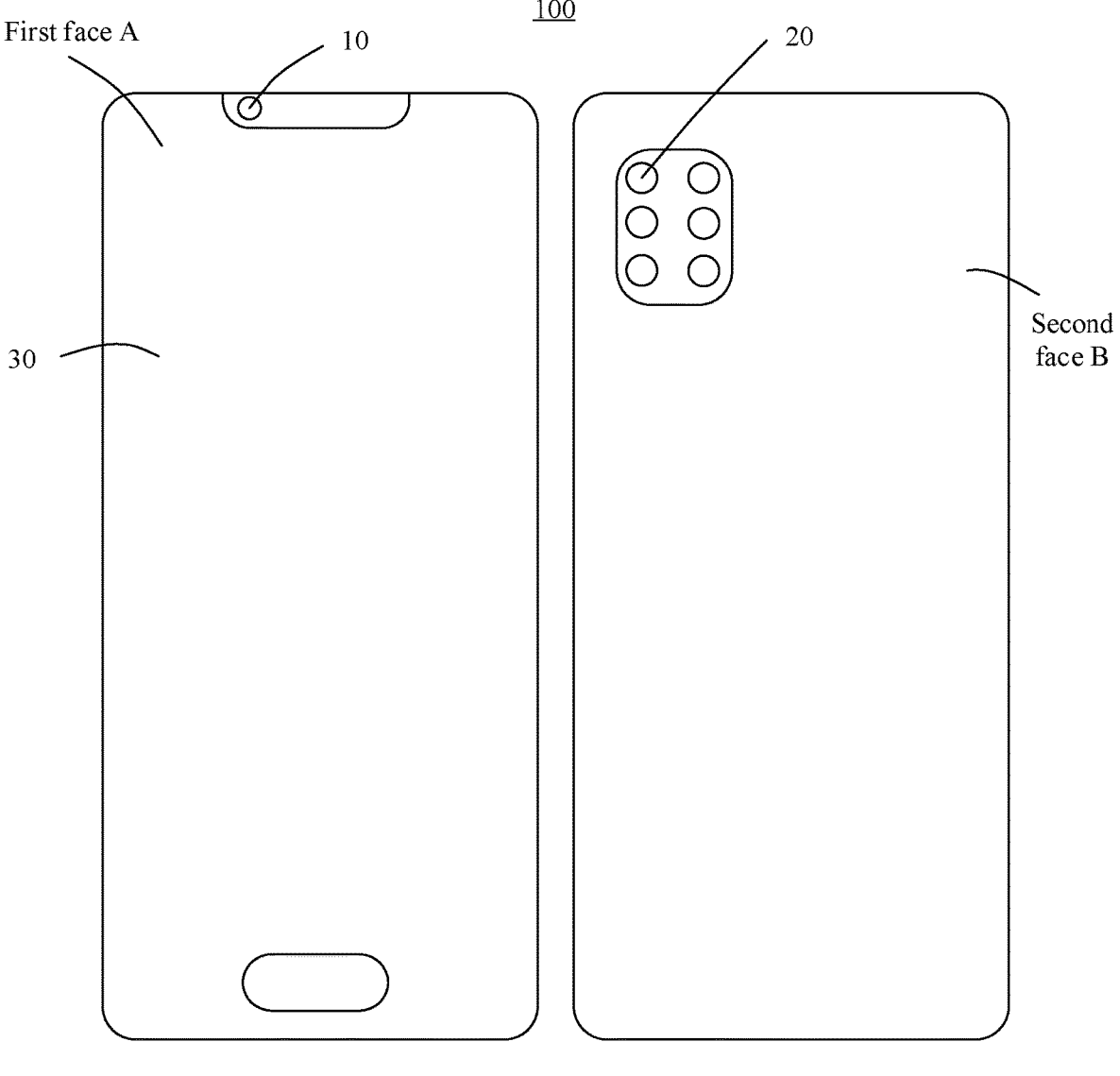
FIG. 1C is a schematic diagram of an electronic device according to an embodiment of this application.

As shown in FIG. 1C, the shooting display method provided in embodiments of this application may be applied to an electronic device. The electronic device shown in FIG. 1C is a single-screen intelligent terminal 100. The intelligent terminal 100 in embodiments of this application includes a first camera 10, second cameras 20, and a first screen 30. The intelligent terminal 100 has a first face A and a second face B. The first face A and the second face B are disposed back to back. The first camera 10 and the first screen 30 are disposed on the first face A, and the second cameras 20 are disposed on the second face B.

In this embodiment, the first camera 10 is a front-facing camera, the second cameras 20 are rear-facing cameras, and the first camera 10 and the second cameras 20 are respectively configured to capture images on two sides of the intelligent terminal 100. The first screen 30 is configured to display images captured by the front-facing camera and the rear-facing cameras. Certainly, the first screen 30 is further configured to display another application interface of the intelligent terminal.

The electronic device in embodiments of this application may be user equipment, an access terminal, a remote terminal, a mobile device, a user terminal, a wireless communication device, a user agent, or a user apparatus that has a shooting function and a display function. The intelligent terminal may be a mobile phone, a tablet computer (e.g., pad), a computer having a wireless transceiver function, a session initiation protocol (SIP) phone, a personal digital assistant (PDA), a handheld device having a wireless communication function, a computer, or another processing device, an augmented reality (AR) intelligent terminal, a wireless terminal in a smart home, an intelligent terminal in a future 5G network, an intelligent terminal in a future evolved public land mobile network (PLMN), or the like. This is not limited in embodiments of this application. In the following embodiments, an example in which an electronic device is an intelligent terminal is used for description.

For the single-screen terminal shown in FIG. 1C, embodiments of this application provide a shooting display method. When a user touches a screen or operates a button to input a first operation to the intelligent terminal, so that when the intelligent terminal starts, based on the first operation, the rear-facing cameras to perform shooting or opens an application using the rear-facing cameras, the intelligent terminal determines whether a target person exists within a preset distance in front of the screen and whether the target person looks at (e.g., stares at, watches, or focuses on) the screen. If the target person is within the preset distance in front of the screen, and the target person looks at (e.g., stares at, watches, or focuses on) the screen, it is determined that the target person is a user of the intelligent terminal, and the user uses the rear-facing cameras of the intelligent terminal to perform shooting, that is, the screen of the intelligent terminal is used by the user. Otherwise, it is determined that the screen of the intelligent terminal is not used by the user, and the intelligent terminal performs blur processing on content displayed on the screen or turns off the screen, to prevent user information from being leaked through the screen in a shooting process.

It should be noted that the shooting display method provided in embodiments of the present disclosure may be executed by an electronic device, or a processor of the electronic device, or a control module that is in the electronic device and that is configured to perform the shooting display method. In embodiments of the present disclosure, an example in which an intelligent terminal is used as an electronic device to perform a shooting display method is used to describe the shooting display method provided in embodiments of the present disclosure.

Figure 2:
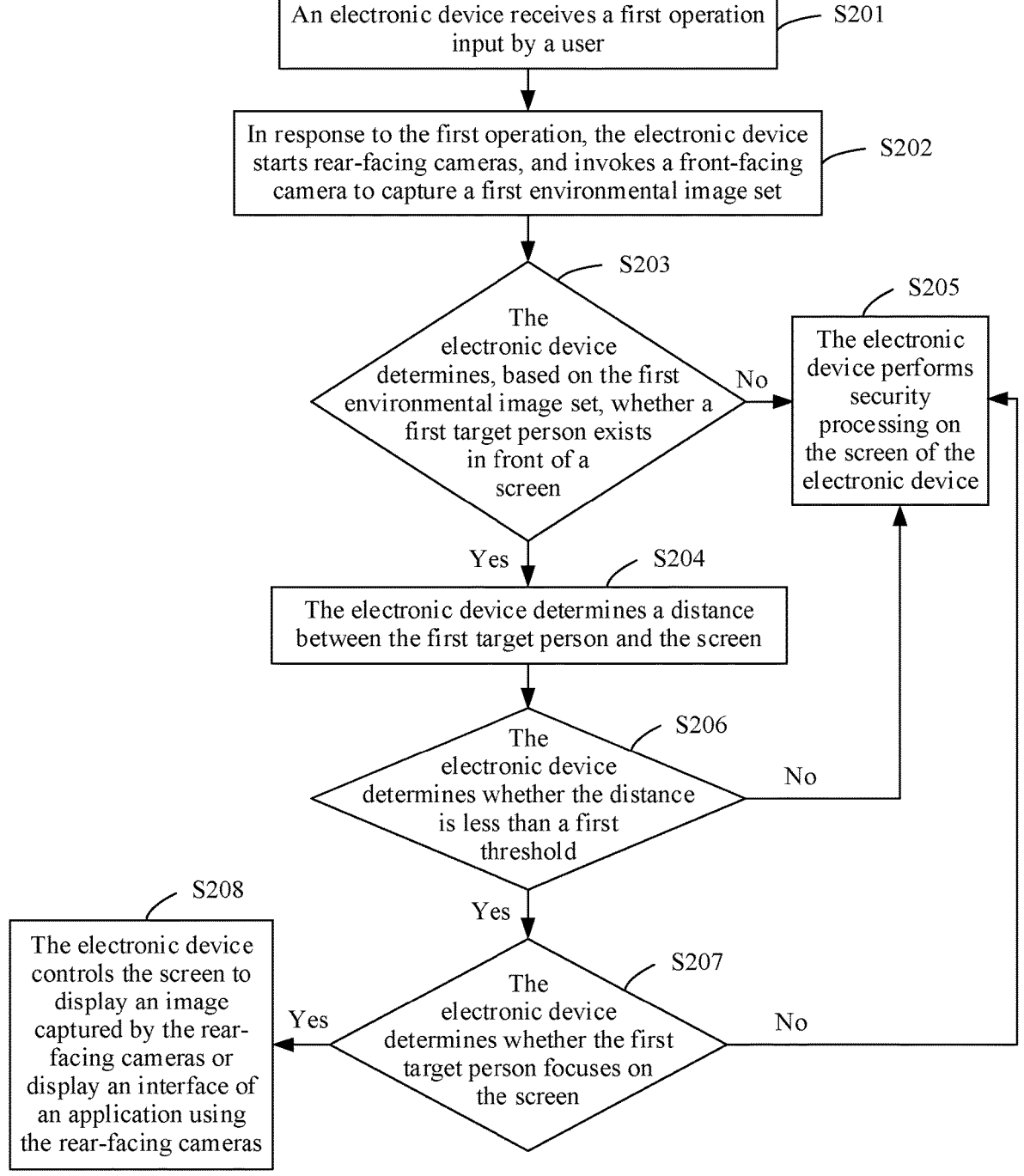
FIG. 2 is a flowchart of a shooting display method according to an embodiment of this application.

FIG. 2 is a flowchart of a shooting display method according to an embodiment of this application. The shooting display method provided in this embodiment of this application is applied to a single-screen electronic device having a shooting function and a display function, for example, the electronic device in FIG. 1C.

For ease of understanding this application, in the embodiment shown in FIG. 2, the first camera 10 is referred to as a front-facing camera, and the second cameras 20 are referred to as rear-facing cameras.

As shown in FIG. 2, a shooting display method of a user provided in an embodiment of this application includes the following operations.

S201: An electronic device receives a first operation input by a user.

The first operation is used to start rear-facing cameras or used to open an application using the rear-facing cameras.

If the electronic device starts the rear-facing cameras based on the first operation, the first operation is that the user touches a screen of the intelligent terminal or taps a button of the intelligent terminal (for example, simultaneously presses a volume button and a power button) to start the rear-facing cameras of the intelligent terminal.

If the electronic device opens, based on the first operation, the application (for example, a skin detection application or a sunscreen detection application like an Aijifu app) using the rear-facing cameras, the first operation may be that the user touches a chart of a corresponding application on the screen to open the application.

S202: In response to the first operation, the electronic device starts the rear-facing cameras, and invokes a front-facing camera to capture a first environmental image set.

In some embodiments, after receiving the first operation on the rear-facing cameras, in addition to invoking the rear-facing cameras, the intelligent terminal may further invoke the front-facing camera to capture the first environmental image set.

In an embodiment, to save power of the electronic device, the intelligent terminal invokes the front-facing camera only after the rear-facing cameras are started, so that the front-facing camera captures an environmental image set corresponding to a side of the screen of the intelligent terminal.

In an embodiment, after the intelligent terminal detects that the user starts the rear-facing cameras, the intelligent terminal controls the front-facing camera to periodically shoot an image. A shooting periodicity may be adjusted based on an actual scenario, for example, three seconds, five seconds, or seven seconds.

In an embodiment, the first environmental image set is an image set shot by the front-facing camera within a preset time, and the image set includes a preset quantity of images, for example, one, two, or five images. The preset time may be three seconds, four seconds, five seconds, or the like.

In some embodiments, after detecting that the user invokes the rear-facing cameras, the intelligent terminal captures an image every preset duration to obtain the preset quantity of images. For example, the preset duration is 60 ms, and the preset quantity is five. After detecting that the user invokes the rear-facing cameras, the electronic device captures images at 60 ms, 120 ms, 180 ms, 240 ms, and 300 ms (herein, a time at which the user is detected around the electronic device is used as a start time 0 ms), and captures five images to obtain an image set. The image set is the first environmental image set.

Certainly, in another embodiment, the first image set may be a video stream captured by the front-facing camera within the preset time.

In an embodiment, the front-facing camera has a shooting area, and the front-facing camera is configured to capture an image in the shooting area. The user is in an active area when using the intelligent terminal. The active area is smaller than the shooting area and is located in the shooting area, to ensure that the user (especially a face of the user) is located in the shooting area when the user uses the intelligent terminal. The intelligent terminal is only configured to identify the shooting area in the first environmental image set. A focal length of the intelligent terminal may be adjusted to adjust a range of the shooting area, so that the active area is close to the area range of the shooting area, to reduce the shooting area of the front-facing camera and reduce a range of an identification area (namely, the shooting area) of the intelligent terminal.

S203: The electronic device determines, based on the first environmental image set, whether a first target person exists in front of the screen. If the first target person exists in front of the screen, operation S204 is performed. If the first target person does not exist in front of the screen, operation S205 is performed.

In some embodiments, the intelligent terminal identifies whether a target person exists in an environmental image, and determines, based on an identification result, whether the target person exists in front of the screen. For example, if the target person exists in the environmental image, it is determined that the target person exists in front of the screen; or if the target person does not exist in the environmental image, it is determined that the target person does not exist in front of the screen.

The target person is a person existing in the environmental image, and the person may be a user of the intelligent terminal, or may be a bystander (for example, a person A is using the intelligent terminal, and a person B is watching by the side), or may be a passerby (when the front-facing camera captures an image, a person C passes the shooting area of the front-facing camera).

Further, the first target person may be one person, or may be a plurality of persons. For example, if two persons are in front of the screen at the same time, the environmental image captured by the front-facing camera includes two persons, and each of the two persons is the first target person.

In an embodiment of this application, the intelligent terminal may identify, by using a user identification model, whether the target person exists in the environmental image. The user identification model is configured to identify whether a facial feature exists in the environmental image, to determine whether the target person exists in the environmental image. The user identification model may be a neural network model.

In an embodiment, the first environmental image set includes a plurality of images captured by the front-facing camera within the preset time. The intelligent terminal may determine, by using the first environmental image set, whether duration in which the target person does not exist in front of the screen reaches a time threshold. If the duration in which the target person does not exist in front of the screen reaches the time threshold, the intelligent terminal may determine that the target person does not exist in front of the screen. If the duration in which the target person does not exist in front of the screen does not reach the time threshold, the intelligent terminal may determine that the target person exists in front of the screen. Certainly, after determining that the target person does not exist in front of the screen, the intelligent terminal is further configured to control the front-facing camera to continue to capture a first environmental image set, continue to determine, based on the re-captured first environmental image set, whether the target person exists in the environmental image, and then cyclically perform the foregoing operations in a process in which the user starts the rear-facing cameras, to determine whether the target person exists in front of the screen.

In some embodiments, the intelligent terminal first determines whether the first target person exists in the plurality of images in the first environmental image set. If the first target person exists in at least some of the plurality of images, the intelligent terminal determines duration in which the first target person exists in the plurality of images, and determines whether the duration is greater than a first time threshold. If the duration is greater than the first time threshold, the intelligent terminal determines that the first target person exists in front of the first screen. If the duration is less than or equal to the first time threshold, the intelligent terminal determines that the target person does not exist in front of the first screen. The front-facing camera shoots a preset quantity of images within the preset time, and only when duration in which the target person exists in front of the screen meets the first time threshold, it can be determined that the target person exists in front of the first screen, to prevent a passerby that passes quickly from affecting determining of the intelligent terminal.

For example, the first environmental image set includes ten images captured by the front-facing camera within five seconds, and the first time threshold is three seconds. When the target person exists in six images of the ten images, duration in which the target person exists in front of the first screen is obtained based on the images. When the target person does not exist in front of the first screen for three seconds, it is determined that the target person does not exist in front of the first screen. If duration in which the target person does not exist in front of the first screen is less than or equal to three seconds, it is determined that the target person does not exist in front of the first screen.

Operation S204: The electronic device determines a distance between the first target person and the screen. Then, operation S206 is performed.

In an embodiment, the front-facing camera is a time-of-flight (ToF) camera, and the time-of-flight camera may measure a distance between a target person and a home screen. In some embodiments, the time-of-flight camera sends a data signal, receives the data signal reflected by the target person, and measures the distance between the target person and the home screen by using a round-trip time-of-flight of the data signal. A time at which the time-of-flight camera sends a data signal is recorded as Tt, a time at which the time-of-flight camera receives the data signal reflected by the target person is recorded as Tr, and a unidirectional time-of-flight of the data signal between the time-of-flight camera and the target person is $Tf=(Tt-Tr)/2$. Therefore, the distance between the time-of-flight camera and the target person is $d=c*Tf$, where c represents a propagation speed of an electromagnetic wave.

In an embodiment, that the intelligent terminal determines a distance between the target person and the screen based on the environmental image includes: obtaining lens parameter information of the front-facing camera, for example, a horizontal field of view is a; obtaining a sensor parameter of the front-facing camera, for example, resolution of an image captured by the sensor is (X, Y); and performing matching from the captured environmental image based on a preset facial recognition algorithm, to obtain that a pixel size of a human face in the environmental image is (X', Y'). It is assumed that an actual width of the human face is C, a distance between the human face and the camera is L, and W is an actual width corresponding to the horizontal field of view in the distance. Because it is known that $C/W=X'/X$ and $W/L=\tan(a/2)$, the following formula may be obtained to calculate the distance between the human face and the front-facing camera, that is, $L=(C*X)/(X'*\tan(a/2))$. Because the home screen and the front-facing camera are roughly on a same plane, the distance between the screen and the target person may be calculated by using the distance between the human face and the front-facing camera. It may be understood that how to calculate a distance between the target person and the home screen based on the environmental image is not limited to the calculation manner provided in this application, and how to determine a distance between the target person and the screen is not limited to the calculation manner provided in this application.

Operation S205: The electronic device performs security processing on the screen of the electronic device.

The performing security processing on the screen includes but is not limited to performing blur processing on content displayed on the screen of the intelligent terminal and controlling the screen of the intelligent terminal to turn off. Security processing is performed on the screen, so that a passerby cannot clearly see the content displayed on the screen, thereby protecting user privacy from being leaked. Content of performing security processing is applicable to embodiments of this application.

It may be understood that, after security processing is performed on the screen of the intelligent terminal, when the user inputs an operation instruction to the intelligent terminal, for example, touches the screen or presses a power button, the screen of the intelligent terminal may perform normal display. Certainly, after security processing is performed on the screen of the intelligent terminal, the intelligent terminal may control the front-facing camera to capture an image, and cyclically perform the method shown in FIG. 2. If it is determined that the target person exists in front of the screen, the target person looks at (e.g., stares at, watches, or focuses on) the screen, and the distance between the target person and the screen is less than a first threshold, the intelligent terminal controls the screen to perform normal display; otherwise, no processing is performed, and security processing continues to be performed on the screen.

S206: The electronic device determines whether the distance is less than the first threshold. If the distance is greater than or equal to the first threshold, operation S205 is performed. If the distance is less than the first threshold, operation S207 is performed.

The first threshold may be a distance, for example, 60 centimeters, between the human face and the home screen when the user of the intelligent terminal normally uses the intelligent terminal.

In some embodiments, the first threshold may be adjusted based on an actual application environment, for example, brightness of a shooting environment. When the brightness of the shooting environment is reduced, the user usually reduces the distance between the user and the screen to clearly see the screen. In this way, the intelligent terminal may establish a relationship between the environmental brightness and the first threshold. For example, when the environmental brightness is within a brightness threshold range, the first threshold remains unchanged, and when the environmental brightness is less than the threshold range, the first threshold is correspondingly adjusted based on a decrease in the environmental brightness.

In some embodiments, the intelligent terminal presents an adjustment page of the first threshold in response to the instruction input by the user, so that the user of the intelligent terminal may adjust the first threshold based on a requirement of the user. For example, the user is a farsighted user. Compared with a common user and a nearsighted user, when the farsighted user uses the intelligent terminal, a distance between a human face and the screen of the intelligent terminal is large. In this way, the user may manually adjust the first threshold, so that the intelligent terminal can accurately determine, based on a use habit of the user, whether the user uses the screen of the intelligent terminal.

Operation S207: The electronic device determines whether the first target person looks at (e.g., stares at, watches, or focuses on) the screen. If the target person looks at (e.g., stares at, watches, or focuses on) the screen, operation S208 is performed. If the target person does not look at the screen, operation S205 is performed.

In an embodiment, a key feature of the target person in the environmental image is identified, so that whether the key feature matches a pre-stored key feature of an eye is determined. If the key feature matches the pre-stored key feature of the eye, it is determined that the target person looks at (e.g., stares at, watches, or focuses on) the screen. If the key feature does not match the pre-stored key feature of the eye, it is determined that the target person does not look at the screen. It may be understood that, whether the target person looks at (e.g., stares at, watches, or focuses on) the screen may be further determined in another manner. A method for determining whether the target person looks at (e.g., stares at, watches, or focuses on) the screen is not limited in this application.

In an embodiment, an idle time is determined based on the first environmental image, where the idle time is duration in which the first target person does not look at the first screen within the preset time. Whether the idle time is greater than a time threshold is determined. If the idle time is greater than the time threshold, it is determined that the first target person does not look at the first screen. If the idle time is less than or equal to the time threshold, it is determined that the first target person looks at (e.g., stares at, watches, or focuses on) the first screen.

For example, the first environmental image set includes a plurality of images successively shot by the intelligent terminal within the preset time. For example, the front-facing camera shoots three images within three seconds, and shooting times of the three images are successively the first second, the next second, and the third second. The intelligent terminal determines whether the target person in the plurality of images looks at (e.g., stares at, watches, or focuses on) the screen. If the target person in the plurality of images looks at (e.g., stares at, watches, or focuses on) the screen, it is determined that the target person looks at (e.g., stares at, watches, or focuses on) the screen. If the target person in the plurality of images does not look at the screen, it is determined that the target person does not look at the screen. If the target person in one part of the plurality of images looks at (e.g., stares at, watches, or focuses on) the screen, and the target person in the other part does not look at the screen, shooting times of the images are determined, and duration, namely, the idle time, in which the target person does not look at the screen is determined based on the shooting times. Whether the idle time is greater than the time threshold is determined. If the duration is greater than the time threshold, it is determined that the target person does not look at the screen. If the duration is less than or equal to the time threshold, it is determined that the target person looks at (e.g., stares at, watches, or focuses on) the screen.

For example, the intelligent terminal captures five images within five seconds, and captures one image every second. If the target person in the first image looks at (e.g., stares at, watches, or focuses on) the screen, and the target person in the second to the fifth images does not look at the screen, the duration is four seconds. If the time threshold is three seconds, and the duration is greater than the time threshold, it is determined that the target person does not look at the screen.

Operation S208: The electronic device controls the screen to display an image captured by the rear-facing cameras or display an interface of an application using the rear-facing cameras.

In this way, when the user invokes the rear-facing cameras of the intelligent terminal to perform shooting or opens an application using the rear-facing cameras, the intelligent terminal controls the front-facing camera to capture an environmental image, and determines whether the target person exists in the environmental image. If the target person exists in the environmental image, the distance between the target person and the screen is less than the first threshold, and the target person looks at (e.g., stares at, watches, or focuses on) the screen of the intelligent terminal, it is determined that the user uses the screen of the intelligent terminal when the user invokes the rear-facing cameras to shoot an image, and the intelligent terminal may control the screen to display the image captured by the rear-facing cameras or display the interface of the application using the rear-facing cameras. Otherwise, it is determined that the user does not use the screen when the user invokes the rear-facing cameras of the intelligent terminal to perform shooting, and the intelligent terminal performs security processing on the screen.

When the user uses the rear-facing cameras of the single-screen terminal to perform shooting, the intelligent terminal determines, based on the front-facing camera (for example, determines based on an image or a video stream captured by the front-facing camera), whether the screen of the intelligent terminal is used. If the screen is not used, security processing is performed on the screen, to prevent user privacy from being leaked through the screen.

In some embodiments, when the user of the intelligent terminal invokes the rear-facing cameras to perform shooting, the intelligent terminal determines, by using the front-facing camera, that the target person does not use the screen of the intelligent terminal. When the user wants to view information or an image displayed on the screen, the user may manually touch the screen to wake up the screen of the intelligent terminal, so that the intelligent terminal determines that the user uses the screen, and the intelligent terminal stops performing security processing on the screen and controls the screen to perform normal display.

It may be understood that, when the intelligent terminal does not receive input indication information (for example, touching a screen or pressing a power button or a volume button) of the user within the preset time, to save power of the intelligent terminal, the screen of the intelligent terminal enters an off state, that is, the intelligent terminal controls the screen to turn off. However, a preset waiting time of the intelligent terminal is generally long, for example, five minutes or even ten minutes. If the preset waiting time is short, a user needs to frequently tap a screen when using the intelligent terminal, and user experience is poor.

According to the shooting display method shown in FIG. 2, when the intelligent terminal determines, based on the first environmental image set, that the target person exists in front of the screen, the intelligent terminal first obtains the distance between the target person and the screen, and determines whether the distance between the target person and the screen is less than the first threshold. If the distance between the target person and the screen is less than the first threshold, the intelligent terminal determines whether the target person looks at (e.g., stares at, watches, or focuses on) the screen. If the distance between the target person and the screen is less than the first threshold, and the target person looks at (e.g., stares at, watches, or focuses on) the screen, it indicates that the target person uses the screen, and the intelligent terminal controls the screen to perform normal display. Otherwise, security processing is performed on the screen. It may be understood that, in another embodiment, when the intelligent terminal determines, based on the first environmental image set, that the target person exists in front of the screen, the intelligent terminal first determines whether the target person looks at (e.g., stares at, watches, or focuses on) the screen. If the target person looks at (e.g., stares at, watches, or focuses on) the screen, the intelligent terminal obtains the distance between the target person and the screen, and determines whether the distance between the target person and the screen is less than the first threshold. If the distance between the target person and the screen is less than the first threshold, and the target person looks at (e.g., stares at, watches, or focuses on) the screen, it indicates that the target person uses the screen, and the intelligent terminal controls the screen to perform normal display. Otherwise, if the target person does not look at the screen, or the distance between the target person and the screen is greater than or equal to the first threshold, security processing is performed on the screen. In other words, in another embodiment of this application, a sequence in which when determining whether the user uses the screen of the intelligent terminal, the intelligent terminal determines whether the target person looks at (e.g., stares at, watches, or focuses on) the screen and determines whether the distance between the target person and the screen is less than a preset value is not limited. For ease of understanding, the implementation method and effects provided in the foregoing embodiment are not described in subsequent embodiments, to avoid redundancy.

Figure 3:
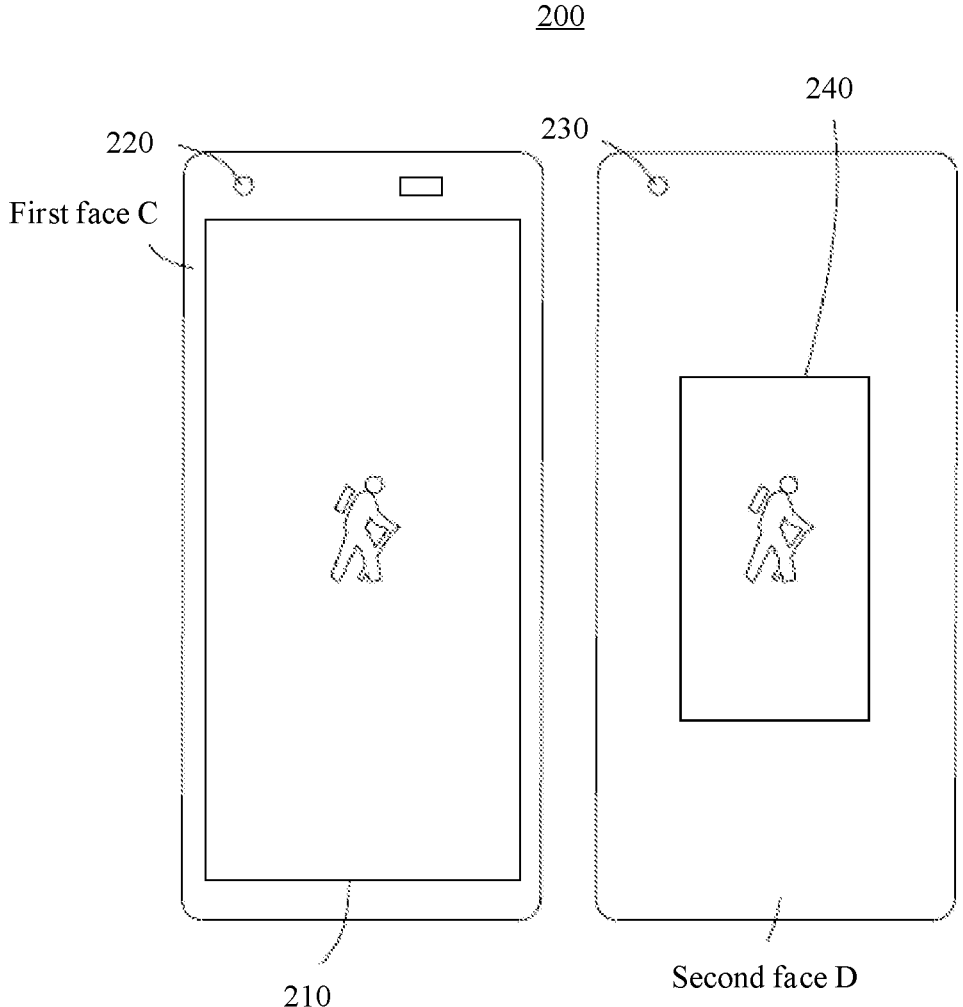
FIG. 3 is a schematic diagram of an application scenario of a shooting display method according to another embodiment of this application.

FIG. 3 is a schematic diagram of an intelligent terminal according to another embodiment of this application.

It should be noted that, based on different requirements, in the shooting display method provided in embodiments of this application, an execution sequence of each operation may be changed, some operations may be omitted, and some operations may be changed.

As shown in FIG. 3, the shooting display method provided in this embodiment of this application is applied to a dual-screen intelligent terminal 200. The intelligent terminal 200 has a first face C and a second face D. A first screen 210 and a first camera 220 are disposed on the first face C, and a second screen 240) and a second camera 230 are disposed on the second face D. The first face C and the second face D are disposed back to back.

In this embodiment, the first camera 220 is a front-facing camera, the first screen 210 is a home screen of the intelligent terminal 200, the second camera 230 is a rear-facing camera, and the second screen 240 is a secondary screen of the intelligent terminal 200.

In this embodiment, a size of the home screen is close to a size of the first face and is greater than a size of the secondary screen. It may be understood that, in another embodiment, the size of the home screen may be the same as the size of the secondary screen. A size relationship between the home screen and the secondary screen is not limited in embodiments of this application.

For ease of understanding, in the following of this embodiment, the first camera 220 is collectively referred to as a front-facing camera, the first screen 210 is collectively referred to as a rear-facing camera, and the referred to as a home screen, the second camera 230 is collectively referred to as a rear-facing camera, and the second screen 240 is collectively referred to as a secondary screen.

Because an existing dual-screen intelligent terminal has a function of simultaneous display of an inner screen and an outer screen, when the intelligent terminal invokes a rear-facing camera to perform shooting, the intelligent terminal invokes, by default, a home screen and a secondary screen to simultaneously display content captured by the rear-facing camera, thereby causing leakage of user information. For example, a user invokes the rear-facing camera to take a selfie, the home screen and the secondary screen are simultaneously invoked by the intelligent terminal to display an image captured by the rear-facing camera, and the home screen may further synchronously display a notification message of another application of the electronic device. User privacy information is easily leaked through the home screen.

To resolve a problem existing in the foregoing scenario, this application provides a shooting display method, and the method is executed by an electronic device. This application is described by using an example in which an intelligent terminal is used as an electronic device. When a rear-facing camera of the intelligent terminal is invoked, the intelligent terminal determines, by using an image or a video stream shot by the rear-facing camera and a front-facing camera, whether a target person exists in front of a home screen and a secondary screen. If the target person does not exist in front of the home screen or the secondary screen, or if the target person exists in front of the home screen or the secondary screen, but the target person does not look at a corresponding screen, namely, the home screen or the secondary screen, or a distance between the target person and the corresponding screen is greater than or equal to a preset value, security processing is performed on the home screen or the secondary screen, to prevent leakage of information of the intelligent terminal.

Figure 4A:
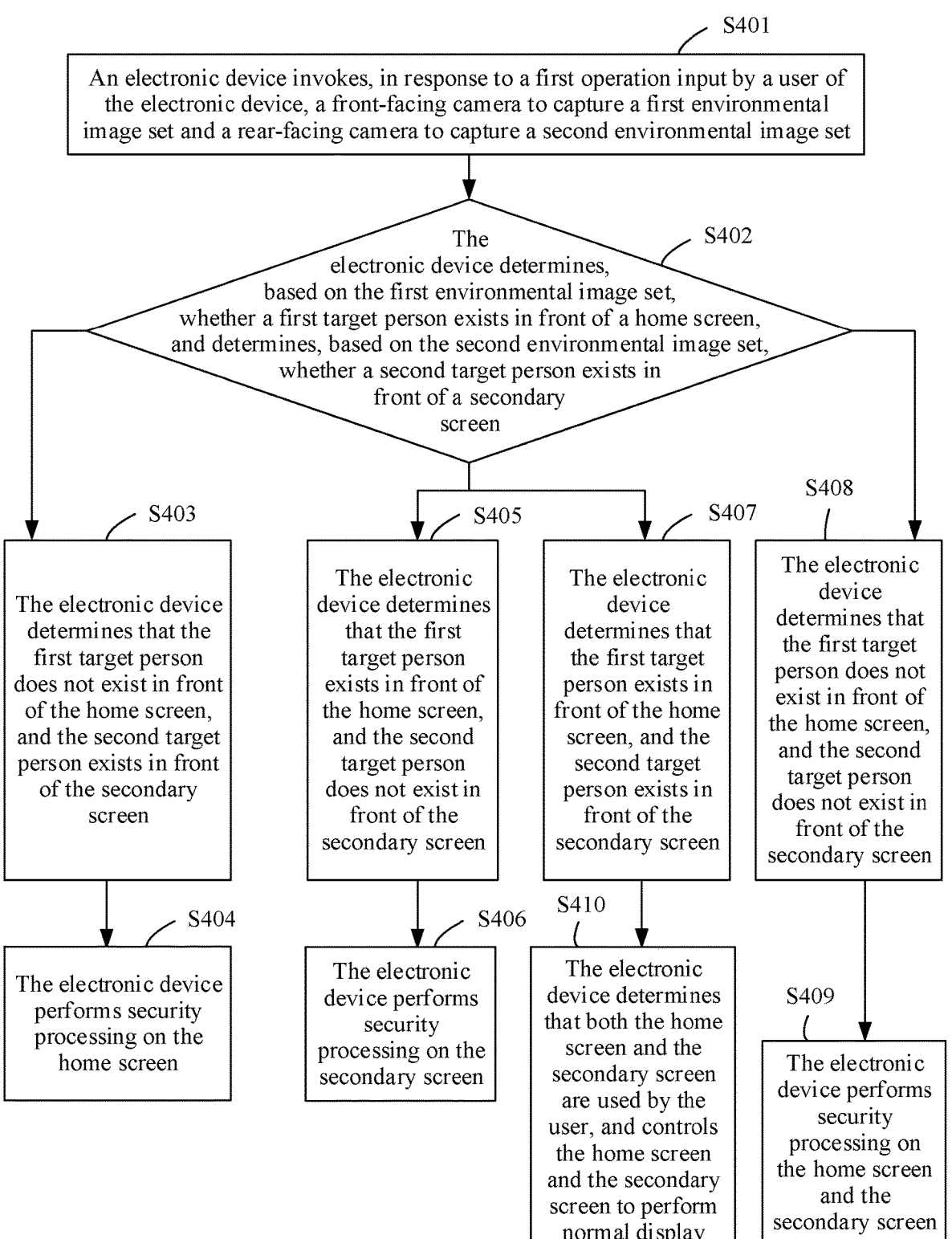
FIG. 4A is a flowchart of a shooting display method according to another embodiment of this application.

In an embodiment, as shown in FIG. 4A, a shooting display method provided in embodiments of this application includes the following operations.

S401: An electronic device invokes, in response to a rear-facing camera invoking instruction input by a user of the electronic device, a front-facing camera to capture a first environmental image set and a rear-facing camera to capture a second environmental image set.

It may be understood that, when the user actively invokes the front-facing camera to perform shooting, the intelligent terminal considers by default that the user of the intelligent terminal takes a selfie. Therefore, a secondary screen of the intelligent terminal does not synchronously display an image captured by the front-facing camera with a home screen. In addition, when the user takes a selfie, only the home screen performs normal display, and the user may observe an expression of the user by using the home screen. Therefore, a scenario in which user privacy is leaked through the home screen is not considered when the user invokes the front-facing camera to perform shooting.

The invoking instruction may be an operation input by the user. For example, the user touches the home screen or presses a power button or a volume button of the intelligent terminal to start the rear-facing camera or start an application using the rear-facing camera.

S402: The electronic device determines, based on the first environmental image set, whether a first target person exists in front of the home screen, and determines, based on the second environmental image set, whether a second target person exists in front of the secondary screen. Based on determining results, operations S403, S405, S407, and S408 are separately performed.

In this embodiment, a method for determining, based on an environmental image, whether a target person exists in front of a screen is the same as operation S202, and details are not described herein again.

S403: The electronic device determines that the first target person does not exist in front of the home screen, and the second target person exists in front of the secondary screen. Then, operation S404 is performed.

For example, the user of the intelligent terminal takes a selfie by using the rear-facing camera.

S404: The electronic device performs security processing on the home screen.

Because the target person does not exist in front of the home screen, it may be determined that the home screen is not used by the user of the terminal, and security processing is performed on the home screen, to prevent user information from being leaked through the home screen.

S405: The electronic device determines that the first target person exists in front of the home screen, and the second target person does not exist in front of the secondary screen. Then, operation S406 is performed.

For example, the user of the intelligent terminal photographs a scenery by using the rear-facing camera.

S406: The electronic device performs security processing on the secondary screen.

Because the target person does not exist in front of the secondary screen, it is determined that the secondary screen is not used by the user of the intelligent terminal, or the user of the intelligent terminal does not pay attention to the secondary screen when invoking the rear-facing camera, and security processing is performed on the secondary screen, to prevent user information from being leaked through the secondary screen.

S407: The electronic device determines that the first target person exists in front of the home screen, and the second target person exists in front of the secondary screen. Then, operation S410 is performed.

For example, the user of the intelligent terminal uses the rear-facing camera of the intelligent terminal to photograph the target person.

Because target persons exist in front of both the home screen and the secondary screen, both the home screen and the secondary screen may be used by the user. If a distance between the first target person and the home screen is less than a first threshold, and the first target person looks at (e.g., stares at, watches, or focuses on) the home screen, the home screen performs normal display. If a distance between the second target person and the secondary screen is less than a second threshold, and the second target person looks at (e.g., stares at, watches, or focuses on) the secondary screen, the secondary screen performs normal display. Otherwise, security processing is performed on the home screen and the secondary screen.

S410: The electronic device determines that both the home screen and the secondary screen are used by the user, and controls the home screen and the secondary screen to perform normal display.

If a target person exists in front of the home screen or the secondary screen, a distance between the target person and a corresponding screen is less than a preset value, and the target person looks at (e.g., stares at, watches, or focuses on) the corresponding screen, it indicates that the corresponding screen is used by the user, and the home screen or the secondary screen may be controlled to perform normal display.

S408: The electronic device determines that the first target person does not exist in front of the home screen, and the second target person does not exist in front of the secondary screen.

For example, the user of the intelligent terminal uses a timed shooting function and places the intelligent terminal at a preset position to photograph a distant scenery. In this way, target persons do not exist in front of the home screen and the secondary screen of the intelligent terminal.

S409: The electronic device performs security processing on the home screen and the secondary screen.

Because target persons do not exist in front of the home screen and the secondary screen, it is determined that neither the home screen nor the secondary screen is used by the user, and security processing is performed on the home screen and the secondary screen, to prevent leakage of user information.

In this way, whether target persons exist in front of the home screen and the secondary screen is determined by using an environmental image. If the target person does not exist in front of the home screen or the secondary screen, it is determined that the screen is not used by the user, and security processing may be performed on the screen, to prevent user privacy from being leaked through the screen.

Figure 4B:
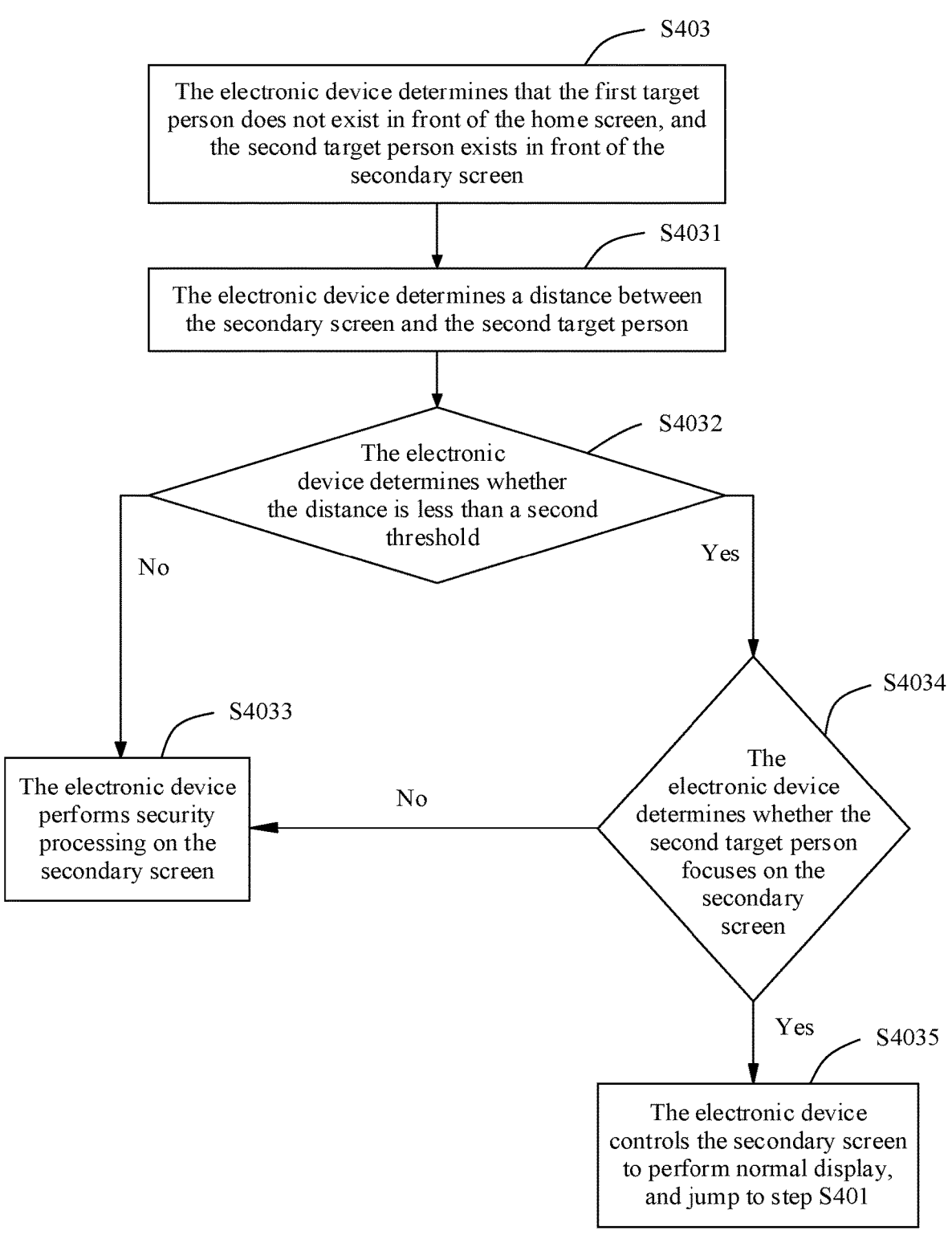
FIG. 4B is a flowchart of a shooting display method for a first scenario according to an embodiment of this application.

In an embodiment, refer to operation S403 in FIG. 4B. In addition to operation S404, the method further includes the following operations.

S4031: The electronic device determines a distance between the secondary screen and the second target person.

S4032: The electronic device determines whether the distance is less than a second threshold.

If the distance is greater than or equal to the second threshold, operation S4033 is performed, that is, the electronic device performs security processing on the secondary screen.

If the distance is less than the second threshold, operation S4034 is performed, that is, the electronic device determines whether the second target person looks at (e.g., stares at, watches, or focuses on) the secondary screen.

If the second target person looks at (e.g., stares at, watches, or focuses on) the secondary screen, operation S4035 is performed, that is, the electronic device controls the screen to perform normal display, and jump to operation S401, so that the front-facing camera and the rear-facing camera capture images and whether the home screen and the secondary screen are used is continuously determined.

If the second target person does not look at the secondary screen, operation S4033 is performed, that is, the electronic device performs security processing on the secondary screen.

In this way, when the user invokes the rear-facing camera of the intelligent terminal to shoot a picture or a video, the intelligent terminal determines that the second target person exists in front of the secondary screen, and further determines that the distance between the second target person and the secondary screen is less than the second threshold, and the target person looks at (e.g., stares at, watches, or focuses on) the secondary screen, to determine that the user uses the secondary screen. Otherwise, the intelligent terminal determines that the target person does not use the secondary screen, and performs security processing on the secondary screen, to prevent leakage of user privacy information.

In the embodiment shown in FIG. 4B, when it is determined that the target person exists in front of the secondary screen, the distance between the target person and the secondary screen is first obtained. If the distance is less than the second threshold, whether the target person looks at (e.g., stares at, watches, or focuses on) the secondary screen is determined. If the target person looks at (e.g., stares at, watches, or focuses on) the secondary screen, and the distance is less than the second threshold, the secondary screen performs normal display. Otherwise, security processing is performed on the secondary screen. It may be understood that, in another embodiment, when it is determined that the target person exists in front of the secondary screen, whether the target person looks at (e.g., stares at, watches, or focuses on) the secondary screen is first determined. If the target person does not look at the secondary screen, security processing is performed on the secondary screen. If the target person looks at (e.g., stares at, watches, or focuses on) the secondary screen, the distance between the target person and the secondary screen is obtained. If the distance is less than the second threshold, the secondary screen performs normal display. Otherwise, security processing is performed on the secondary screen. In other words, when the target person exists in front of the secondary screen, a sequence of determining whether the target person looks at (e.g., stares at, watches, or focuses on) the secondary screen and determining whether the distance between the target person and the secondary screen is less than the second threshold is not limited.

Further, when determining that the secondary screen or the home screen is used, the intelligent terminal is further configured to: invoke the front-facing camera and the rear-facing camera to shoot an image set, continuously determine, based on the image set, whether the secondary screen or the home screen is used, and when the user no longer uses the screen, perform security processing on the screen, to prevent user information from being leaked through the screen.

It may be understood that, in the scenario in operation S405, when the user invokes the rear-facing camera to perform shooting, the target person exists in front of the home screen, and the target person does not exist in front of the secondary screen. A common scenario is that the user of the intelligent terminal performs normal shooting by using the rear-facing camera, for example, photographs a distant scenery.

However, when the user places the intelligent terminal at a preset position, and controls, through voice control (for example, the user says "shooting", and the intelligent terminal performs shooting according to a voice instruction of the user) or by using a selfie stick or a like device, the rear-facing camera of the intelligent terminal to perform shooting, the home screen is not used by the user of the intelligent terminal, but passers-by may exist in front of the home screen. In this case, user privacy information may be seen by the passers-by, Therefore, to ensure that user privacy information is not leaked in a similar scenario, this application provides a detection and determining method in the scenario in operation S405. Whether the target person in front of the home screen uses the home screen is further determined. When the target person does not use the home screen (for example, the target person is a passerby), the home screen is controlled to perform security processing, to prevent leakage of user information. In this case, security processing is performed on both the home screen and the secondary screen of the intelligent terminal.

Figure 4C:
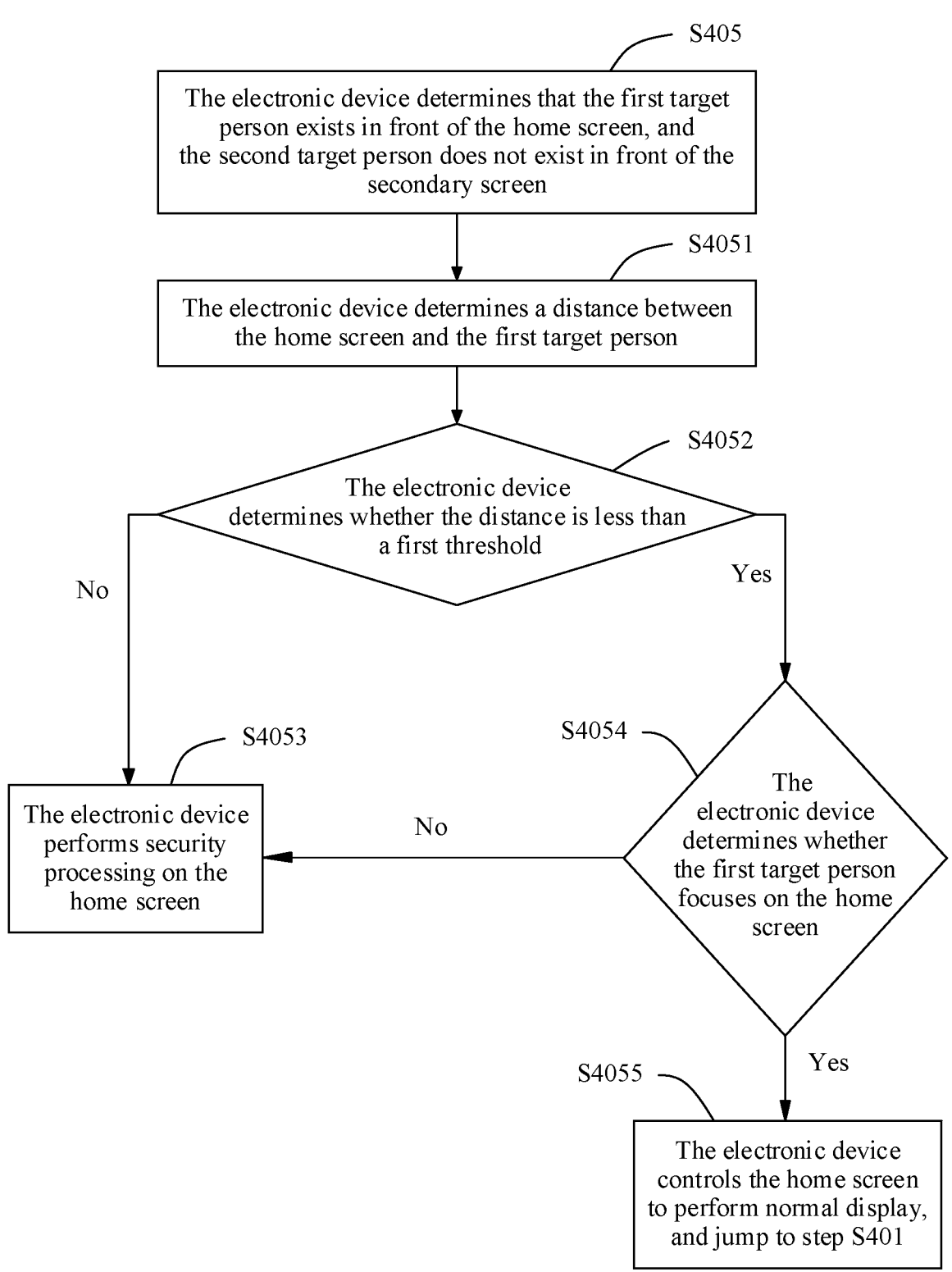
FIG. 4C is a flowchart of a shooting display method for a first scenario according to an embodiment of this application.

In some embodiments, refer to FIG. 4C. After operation S405, in addition to operation S406, the method further includes the following operations.

S4051: The electronic device determines a distance between the home screen and the first target person.

S4052: The electronic device determines whether the distance is less than a first threshold.

If the distance is greater than or equal to the first threshold, operation S4053 is performed, that is, the electronic device performs security processing on the home screen.

If the distance is less than the first threshold, operation S4054 is performed, that is, the electronic device determines whether the first target person looks at (e.g., stares at, watches, or focuses on) the home screen.

If the target person looks at (e.g., stares at, watches, or focuses on) the home screen, operation S4055 is performed, that is, the electronic device controls the home screen to perform normal display, and jump to operation S401, so that the front-facing camera and the rear-facing camera capture images and whether the home screen and the secondary screen are used is continuously determined.

If the target person does not look at the home screen, operation S4053 is performed.

In this way, when the user invokes the front-facing camera or the rear-facing camera of the intelligent terminal to shoot a picture or a video, the intelligent terminal determines that the target person exists in front of the home screen, and further determines that the distance between the target person and the home screen is less than the first threshold, and the target person looks at (e.g., stares at, watches, or focuses on) the home screen, to determine that the target person uses the screen. Otherwise, the intelligent terminal determines that the target person does not use the home screen, and performs blur processing on the screen, to prevent leakage of user privacy information.

In the scenario described in S407, when the user invokes the rear-facing camera to perform shooting, target persons exist in front of both the home screen and the secondary screen, but whether the home screen or the secondary screen is used by a corresponding target person cannot be determined. Therefore, further determining needs to be performed. Whether the home screen or the secondary screen is used is determined based on the distance between the target person and the home screen or the secondary screen and whether the target person looks at (e.g., stares at, watches, or focuses on) the home screen or the secondary screen, and security processing is performed on an unused screen, to prevent user privacy information from being leaked through the screen.

Figure 4D:
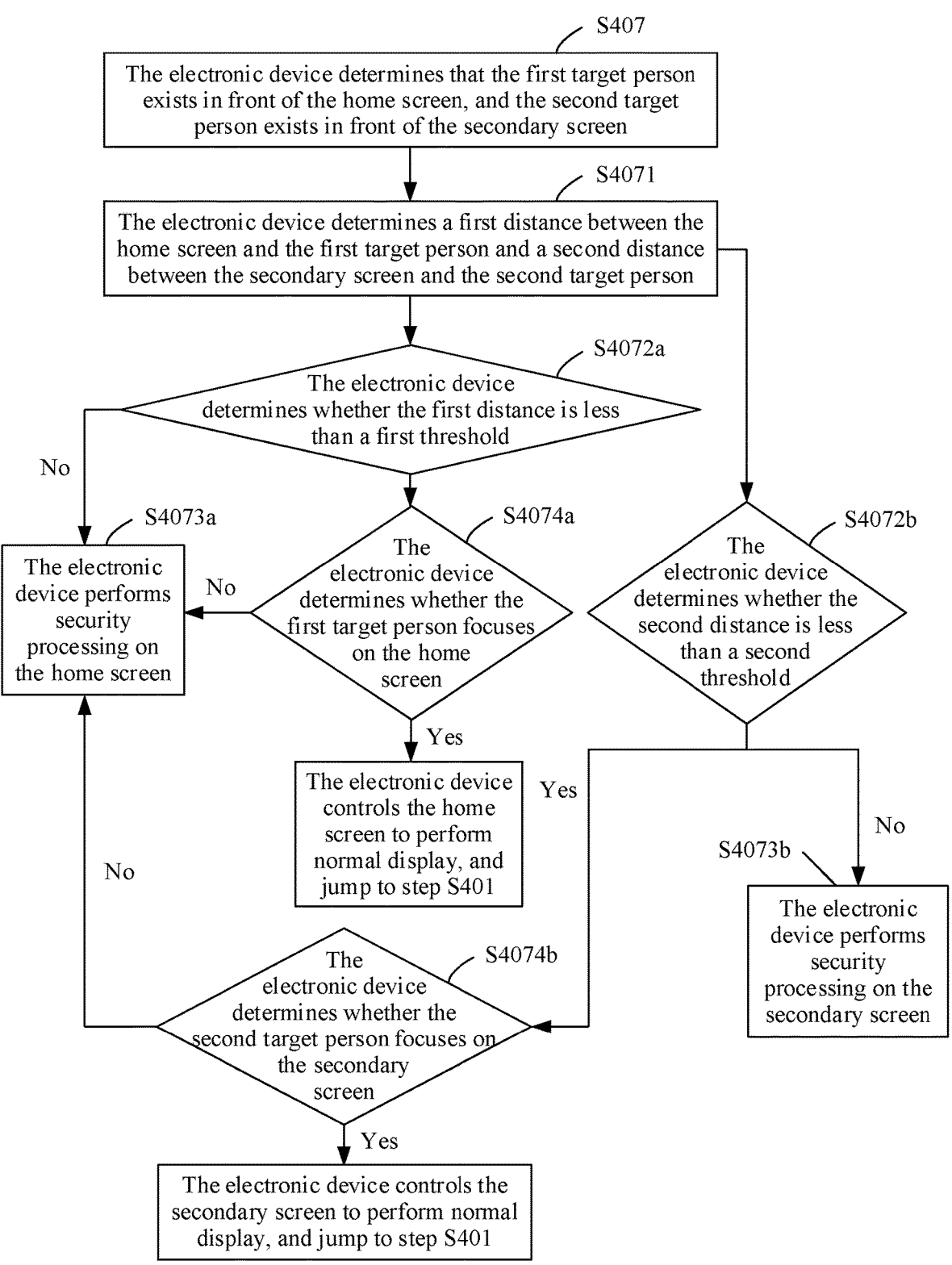
FIG. 4D is a flowchart of a shooting display method for a first scenario according to an embodiment of this application.

In an embodiment, refer to FIG. 4D. After operation S407, the method further includes the following operations.

S4071: The electronic device determines a first distance between the home screen and the first target person and a second distance between the secondary screen and the second target person.

S4072a: The electronic device determines whether the first distance is less than the first threshold.

If the first distance is greater than or equal to the first threshold, operation S4073a is performed, that is, the electronic device performs security processing on the home screen.

If the first distance is less than the first threshold, operation S4074a is performed, that is, the electronic device determines whether the first target person looks at (e.g., stares at, watches, or focuses on) the home screen.

If the first target person looks at (e.g., stares at, watches, or focuses on) the home screen, the home screen is controlled to perform normal display, and jump to operation S401, so that the front-facing camera and the rear-facing camera capture images and whether the home screen and the secondary screen are used is continuously determined.

If the first target person does not look at the home screen, jump to operation S4073a.

S4072b: The electronic device determines whether the second distance is less than the second threshold.

If the second distance is greater than or equal to the second threshold, operation S4073b is performed, that is, the electronic device performs security processing on the secondary screen.

If the second distance is less than the second threshold, operation S4074b is performed, that is, the electronic device determines whether the second target person looks at (e.g., stares at, watches, or focuses on) the secondary screen.

If the second target person looks at (e.g., stares at, watches, or focuses on) the secondary screen, the secondary screen is controlled to perform normal display, and jump to operation S401, so that the front-facing camera and the rear-facing camera capture images and whether the home screen and the secondary screen are used is continuously determined.

If the second target person does not look at the secondary screen, operation S4073b is performed.

In this way, when the user invokes the rear-facing camera of the intelligent terminal to shoot a picture or a video, the intelligent terminal determines that target persons exist in front of both the home screen and the secondary screen, and further determines that the distance between the target person and the home screen is less than the first threshold, and the target person looks at (e.g., stares at, watches, or focuses on) the screen, to determine that the user uses the screen. Otherwise, security processing is performed on an unused screen, to prevent leakage of user privacy information.

It may be understood that, when the user invokes the rear-facing camera of the intelligent terminal to perform shooting in different usage scenarios, ranges of the second threshold are different. For example, if the user performs skin detection by using an image captured by the rear-facing camera of the intelligent terminal, to obtain a clear image of a human face, a distance between the rear-facing camera and a to-be-photographed human face is less than 30 centimeters. In this case, the second threshold may be 30 centimeters. If the user performs shooting by using a wide aperture mode of the rear-facing camera of the intelligent terminal, to enable the rear-facing camera to capture more people or environments, a distance between the rear-facing camera and the to-be-photographed human face is greater than 60 centimeters and less than 100 centimeters. In this case, the second threshold may be 100 centimeters. In this way, after receiving the invoking instruction of the rear-facing camera input by the user, the intelligent terminal is further configured to obtain a usage scenario of the invoking instruction and a correspondence between the usage scenario and the second threshold, and obtain a corresponding second threshold based on a specific usage scenario and the correspondence, so that the corresponding second threshold can be determined based on different usage scenarios.

It may be understood that FIG. 3 is merely an embodiment of a dual-screen intelligent terminal provided in this application. The first face and the second face of the intelligent terminal are disposed back to back. It may be understood that the shooting display method in this application is further applied to another type of dual-screen intelligent terminal, for example, a foldable-screen intelligent terminal. The foldable-screen intelligent terminal may be folded up and down, that is, both an inner face and an outer face of the intelligent terminal have a screen. The foldable-screen intelligent terminal may alternatively be folded on two sides, that is, both a front face and a back face of the intelligent terminal have a screen.

Certainly, the shooting display method provided in this application may be further applied to another type of multi-screen intelligent terminal. For example, the intelligent terminal has three faces, and a screen and a camera are disposed on each face. When a camera on one face of the intelligent terminal is invoked, the intelligent terminal controls cameras on the three faces to capture image sets, and determines, based on the image sets, whether a screen on the face is used. A determining method is as operations shown in FIG. 2 and FIG. 4, and details are not described herein again. When it is determined that the screen on the face is not used, security processing is performed on the screen, to prevent user information from being leaked through the screen. If it is determined that the screen on the face is used by the user, the screen performs normal display. It may be understood that, in this embodiment, only an intelligent terminal with three screens is used as an example. It may be understood that the intelligent terminal may alternatively be a four-screen, five-screen, or six-screen intelligent terminal.

Figure 5:
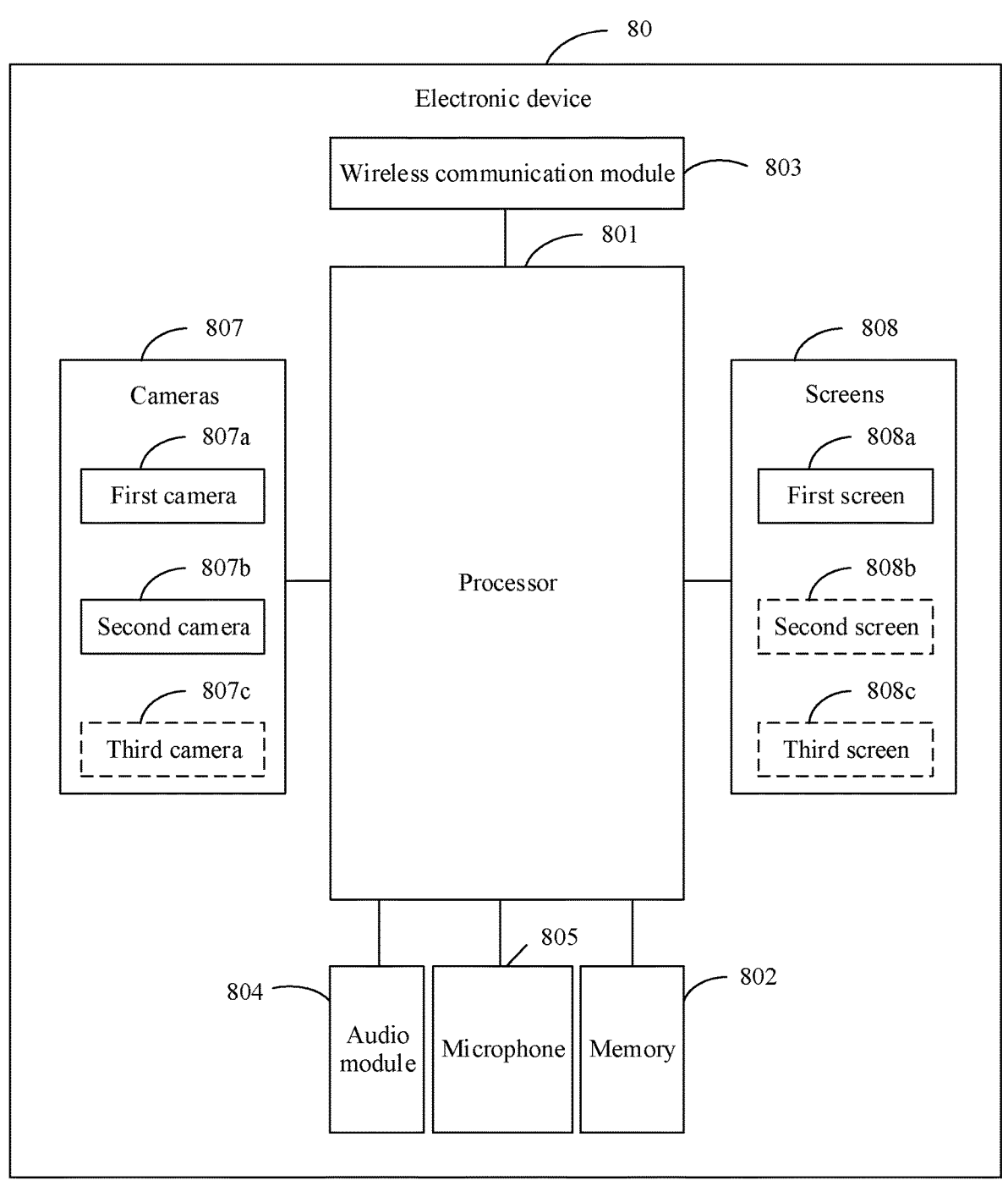
FIG. 5 is a schematic diagram of a structure of an electronic device according to an embodiment of this application.

FIG. 5 is a schematic diagram of a structure of an electronic device according to an embodiment of this application. As shown in FIG. 5, the electronic device 80 may include a processor 801, a memory 802, a wireless communication module 803, an audio module 804, a microphone 805, a sensor (not shown), cameras 807, screens 808, and the like. It may be understood that the structure shown in this embodiment does not constitute a specific limitation on the electronic device 100. In some other embodiments of this application, the electronic device 80 may include more or fewer components than those shown in the figure, or some components may be combined, or some components may be split, or a different component deployment may be used. The components in the figure may be implemented by using hardware, software, or a combination of software and hardware.

The processor 801 may include one or more processing units. For example, the processor 801 may include an application processor (AP), a modem processor, a graphics processing unit (GPU), an image signal processor (ISP), a controller, a video codec, a digital signal processor (DSP), a baseband processor, a display processing unit (DPU), a neural-network processing unit (NPU), and/or the like. Different processing units may be independent components, or may be integrated into one or more processors.

A memory may be disposed in the processor 801, and is configured to store instructions and data. In some embodiments, the memory in the processor 801 is a cache. The memory may store instructions or data that has been used or cyclically used by the processor 801. If the processor 801 needs to use the instruction or the data again, the processor 801 may directly invoke the instruction or the data from the memory, to avoid repeated access and reduce a waiting time of the processor 801, thereby improving efficiency of the electronic device 80.

In some embodiments, the processor 801 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like. It may be understood that an interface connection relationship between the modules shown in this embodiment of the present disclosure is merely an example for description, and does not constitute a limitation on the structure of the electronic device 80. In some other embodiments of this application, the electronic device 100 may alternatively use an interface connection manner different from that in the foregoing embodiment, or use a combination of a plurality of interface connection manners.

The memory 802 may be configured to store one or more computer programs, and the one or more computer programs include instructions. The processor 801 may run the instructions stored in the memory 802, so that the electronic device 100 is enabled to perform related actions in embodiments of this application. The memory 802 may include a program storage area and a data storage area. The program storage area may store an operating system, and the program storage area may further store one or more applications. The data storage area may store data (for example, a photo and a contact) created during use of the electronic device 80, and the like. In addition, the memory 802 may include a high-speed random access memory, and may further include a non-volatile memory, for example, at least one magnetic disk storage device, a flash storage device, or a universal flash storage (UFS). In some embodiments, the processor 801 may run the instructions stored in the memory 802 and/or the instructions stored in the memory disposed in the processor 801, to enable the electronic device 80 to perform various function applications and data processing.

A wireless communication function of the electronic device 80 may be implemented by using the wireless communication module 803. The wireless communication module 803 may provide a wireless communication solution that is applied to the electronic device 80 and that includes a wireless local area network (WLAN), Bluetooth, a global navigation satellite system (GNSS), frequency modulation (frequency modulation, FM), near field communication (NFC), and an infrared (IR) technology. The wireless communication module 803 may be one or more components integrating at least one communication processing module. The wireless communication module 803 in embodiments of this application is configured to implement a transceiver function of the electronic device.

The electronic device 80 may implement an audio function, like music playing and recording, by using the audio module 804, the microphone 805, and the like. The audio module 804 is configured to convert digital audio information into an analog audio signal for output, and is also configured to convert an analog audio input into a digital audio signal. The audio module 804 may be further configured to encode and decode an audio signal. In some embodiments, the audio module 804 may be disposed in the processor 801, or some functional modules of the audio module 804 are disposed in the processor 801. The electronic device 100 may be provided with at least one microphone 805. In some other embodiments, the electronic device 80 may be provided with two microphones 805, to collect a sound signal and further implement a noise reduction function. In some other embodiments, the electronic device 80 may alternatively be provided with three, four, or more microphones 805, to collect a sound signal, reduce noise, identify a sound source, implement a directional recording function, and the like.

The sensor of the electronic device 80 may include a pressure sensor, a distance sensor, an optical proximity sensor, and the like. The pressure sensor is configured to sense a pressure signal, and may convert the pressure signal into an electrical signal. In some embodiments, the pressure sensor may be disposed on each screen 808, and the electronic device 80 detects intensity of the touch operation by using the pressure sensor. The distance sensor is configured to measure a distance. The electronic device may measure the distance through infrared or laser. The optical proximity sensor may include a light-emitting diode (LED) and an optical detector. The light-emitting diode may be an infrared light-emitting diode. The optical detector may be a photodiode. The electronic device 100 emits infrared light by using the light-emitting diode. The electronic device 80 detects infrared reflected light from a nearby object by using the optical detector. When detecting sufficient reflected light, the electronic device 80 may determine that there is an object near the electronic device 80. When detecting insufficient reflected light, the electronic device 80 may determine that there is no object near the electronic device 80.

The electronic device 80 may implement a shooting function by using the cameras 807. The cameras 807 may include a first camera 807a, a second camera 807b, and a third camera 807c. In addition, the electronic device 80 may implement a display function by using the screens 808. The screens 808 are configured to display an image, a video, and the like. Each screen 808 includes a display panel. The display panel may be a liquid crystal display (LCD), an organic light-emitting diode (OLED), an active-matrix organic light-emitting diode (AMOLED), a flexible light-emitting diode (FLED), a mini LED, a micro LED, a micro OLED, a quantum dot light-emitting diode (QLED), or the like. In some embodiments, the screens 808 include a first screen 808a, a second screen 808b, and a third screen 808c. In some embodiments, a camera is disposed in correspondence with a screen, that is, the electronic device has a plurality of faces, and a corresponding screen and camera are disposed on each face. In some embodiments, the electronic device has a plurality of cameras and a plurality of screens.

In embodiments of this application, whether a user exists around the electronic device 80 may be detected by using the distance sensor and the optical proximity sensor. The camera may capture an image set of the user. The processor 801 is configured to perform the actions in the foregoing embodiments. Based on the electronic device 80 shown in FIG. 5, the shooting display method in the foregoing embodiments may be implemented. It should be understood that a structure description in FIG. 5 is an example of the electronic device 80.

An embodiment further provides a computer storage medium. The computer storage medium stores computer instructions. When the computer instructions are run on an electronic device, the electronic device is enabled to perform the related method operations, to implement the shooting display method in the foregoing embodiments.

An embodiment further provides a computer program product. When the computer program product runs on an electronic device, the electronic device is enabled to perform the foregoing related operations, to implement the shooting display method in the foregoing embodiments.

In addition, an embodiment of this application further provides an apparatus. The apparatus may be a chip system, a component, or a module. The apparatus may include a processor and a memory that are connected. The memory is configured to store computer-executable instructions. When the apparatus runs, the processor may execute the computer-executable instructions stored in the memory, to enable the chip to perform the shooting display method in the foregoing method embodiments.

The electronic device, the computer storage medium, the computer program product, or the chip provided in embodiments is configured to perform the corresponding method provided above. Therefore, for beneficial effects that can be achieved by the electronic device, the computer storage medium, the computer program product, and the chip, refer to the beneficial effects of the corresponding method provided above. Details are not described herein.

The foregoing descriptions of implementations allow a person skilled in the art to clearly understand that, for the purpose of convenient and brief description, division of the foregoing functional modules is used as an example for illustration. During actual application, the foregoing functions can be allocated to different modules and implemented based on a requirement, that is, an inner structure of an apparatus is divided into different functional modules to implement all or some of the functions described above.

In the several embodiments provided in this application, it should be understood that the disclosed apparatus and method may be implemented in other manners. For example, the apparatus embodiments described above are merely examples. For example, division into the modules or units is merely logical function division, and may be other division in an actual implementation. For example, a plurality of units or components may be combined or may be integrated into another apparatus, or some features may be ignored or not be performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may be one or more physical units, that is, may be located in one place, or may be distributed on different places. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions in embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip or the like) or a processor to perform all or some of the operations of the methods described in embodiments of this application. The foregoing storage medium includes any medium that can store program code, like a USB flash drive, a removable hard disk, a read-only memory (ROM), a random access memory (RAM), a magnetic disk, or an optical disc.

The foregoing descriptions are merely example implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method of image acquisition and display, the method comprising:
   receiving, at an electronic device having (1) a first face including a first screen and a first camera, and (2) a second face including a second camera, a user input of a first operation;
   in response to the first operation, starting the second camera, and invoking the first camera to capture a first environmental image set;
   determining, by the electronic device based on the first environmental image set, whether a first target person is in front of the first screen; and
   performing security processing on the first screen when the first target person is not in front of the first screen; or
   obtaining a first distance between the first target person and the first screen when the first target person is in front of the first screen; and
   performing security processing on the first screen if the first distance is less than a first threshold, and the first target person does not look at the first screen, or if the first distance is greater than or equal to the first threshold, wherein
   the performing security processing on the first screen comprises blurring content displayed on the first screen or shutting off the first screen.

2. The method according to claim 1, further comprising:
   properly displaying the content if the first distance is less than the first threshold, and the first target person looks at the first screen.

3. The method according to claim 1, wherein when the first target person is in front of the first screen, the method further comprises:
   determining whether the first target person looks at the first screen; and
   if the first target person does not look at the first screen, performing security processing on the first screen.

4. The method according to claim 3, wherein the first environmental image set comprises an image captured by the first camera within a preset time, and the determining whether the first target person looks at the first screen comprises:
   determining an idle time based on the first environmental image set, wherein the idle time is duration in which the first target person does not look at the first screen within the preset time;
   determining whether the idle time is greater than a time threshold; and
   if the idle time is greater than the time threshold, determining that the first target person does not look at the first screen; or
   if the idle time is less than or equal to the time threshold, determining that the first target person looks at the first screen.

5. The method according to claim 1, further comprising:
   positioning the first face and the second face back to back.

6. The method according to claim 1, wherein the electronic device further comprises a second screen, the second screen is disposed on the second face, and the method further comprises:
   in response to the first operation, determining, by the electronic device based on a second environmental image set captured by the second camera, whether a second target person is in front of the second screen; and if the second target person is not in front of the second screen, performing security processing on the second screen, wherein the performing security processing on the second screen comprises blurring content displayed on the second screen or shutting off the second screen.

7. The method according to claim 6, wherein the method further comprises:

if the second target person exists in front of the second screen, determining whether the second target person looks at the second screen, and if the second target person does not look at the second screen, performing security processing on the second screen.

8. The method according to claim 7, wherein the method further comprises:

if the second target person looks at the second screen, obtaining a second distance between the second target person and the second screen, and determining whether the second distance is less than a second threshold; and if the second distance is greater than or equal to the second threshold, performing security processing on the second screen.

9. The method according to claim 6, further comprising:

if the second target person is in front of the second screen, obtaining a second distance between the second target person and the second screen;

determining whether the second distance is less than a second threshold; and if the second distance is greater than or equal to the second threshold, performing security processing on the second screen.

10. The method according to claim 9, wherein the method further comprises:

if the second distance is less than the second threshold, determining whether the second target person looks at the second screen; and if the second target person does not look at the second screen, performing security processing on the second screen.

11. The method according to claim 10, wherein the method further comprises:

if the second distance is less than the second threshold, and the second target person looks at the second screen, controlling the second screen to perform normal display.

12. The method according to claim 10, wherein the electronic device stores a plurality of second thresholds, and the method further comprises:

obtaining a usage scenario of the first operation;

obtaining a correspondence between the usage scenario and the plurality of second thresholds; and determining, based on the usage scenario and the correspondence, the second threshold corresponding to the usage scenario.

13. A electronic device, comprising:

a first face and a second face;

a first screen and a first camera disposed on the first face;

a second camera disposed on the second face;

at least one processor; and a memory coupled to the at least one processor and configured to store programming instructions that, when executed by the at least one processor, cause the electronic device to perform operations comprising:

receiving a first operation input by a user, wherein the first operation is used to start the second camera or used to open an application using the second camera;

in response to the first operation, starting the second camera, and invoking the first camera to capture a first environmental image set;

determining whether a first target person is in front of the first screen based on the first environmental image set; and performing security processing on the first screen when the first target person is not in front of the first screen; or obtaining a first distance between the first target person and the first screen when the first target person is in front of the first screen; and performing security processing on the first screen if the first distance is less than a first threshold, and the first target person does not look at the first screen, or if the first distance is greater than or equal to the first threshold, wherein the performing security processing on the first screen comprises blurring content displayed on the first screen or shutting off the first screen.

14. The electronic device according to claim 13, wherein the operations further comprise:

properly displaying the content if the first distance is less than the first threshold, and the first target person looks at the first screen.

15. The electronic device according to claim 13, wherein when the first target person is in front of the first screen, the operations further comprise:

determining whether the first target person looks at the first screen; and if the first target person does not look at the first screen, performing security processing on the first screen.

16. The electronic device according to claim 13, wherein the first face and the second face are disposed back to back.

17. The electronic device according to claim 13, wherein the electronic device further comprises a second screen, the second screen is disposed on the second face, and the operations further comprise:

in response to the first operation, determining whether a second target person is in front of the second screen, based on a second environmental image set captured by the second camera; and if the second target person is not in front of the second screen, performing security processing on the second screen, wherein the performing security processing on the second screen comprises blurring content displayed on the second screen or shutting off the second screen.

18. The electronic device according to claim 17, wherein the operations further comprise:

if the second target person is in front of the second screen, obtaining a second distance between the second target person and the second screen;

determining whether the second distance is less than a second threshold; and if the second distance is greater than or equal to the second threshold, performing security processing on the second screen.

19. The electronic device according to claim 18, wherein the operations further comprise:

if the second distance is less than the second threshold, determining whether the second target person looks at the second screen; and if the second target person does not look at the second screen, performing security processing on the second screen.

20. A non-transitory computer readable medium configured to store instructions that, when executed by at least one processor of an electronic device, wherein the electronic device comprises a first face and a second face, a first screen and a first camera are disposed on the first face, a second camera is disposed on the second face, cause the electronic device to perform operations comprising:

receiving a first operation input by a user, wherein the first operation is used to start the second camera or used to open an application using the second camera;

in response to the first operation, starting the second camera, and invoking the first camera to capture a first environmental image set;

determining whether a first target person is in front of the first screen based on the first environmental image set; and performing security processing on the first screen when the first target person is not in front of the first screen; or obtaining a first distance between the first target person and the first screen when the first target person is in front of the first screen; and performing security processing on the first screen if the first distance is less than a first threshold, and the first target person does not look at the first screen, or if the first distance is greater than or equal to the first threshold, wherein the performing security processing on the first screen comprises blurring content displayed on the first screen or shutting off the first screen.

* * * * *